UNITED STATES PATENT OFFICE.

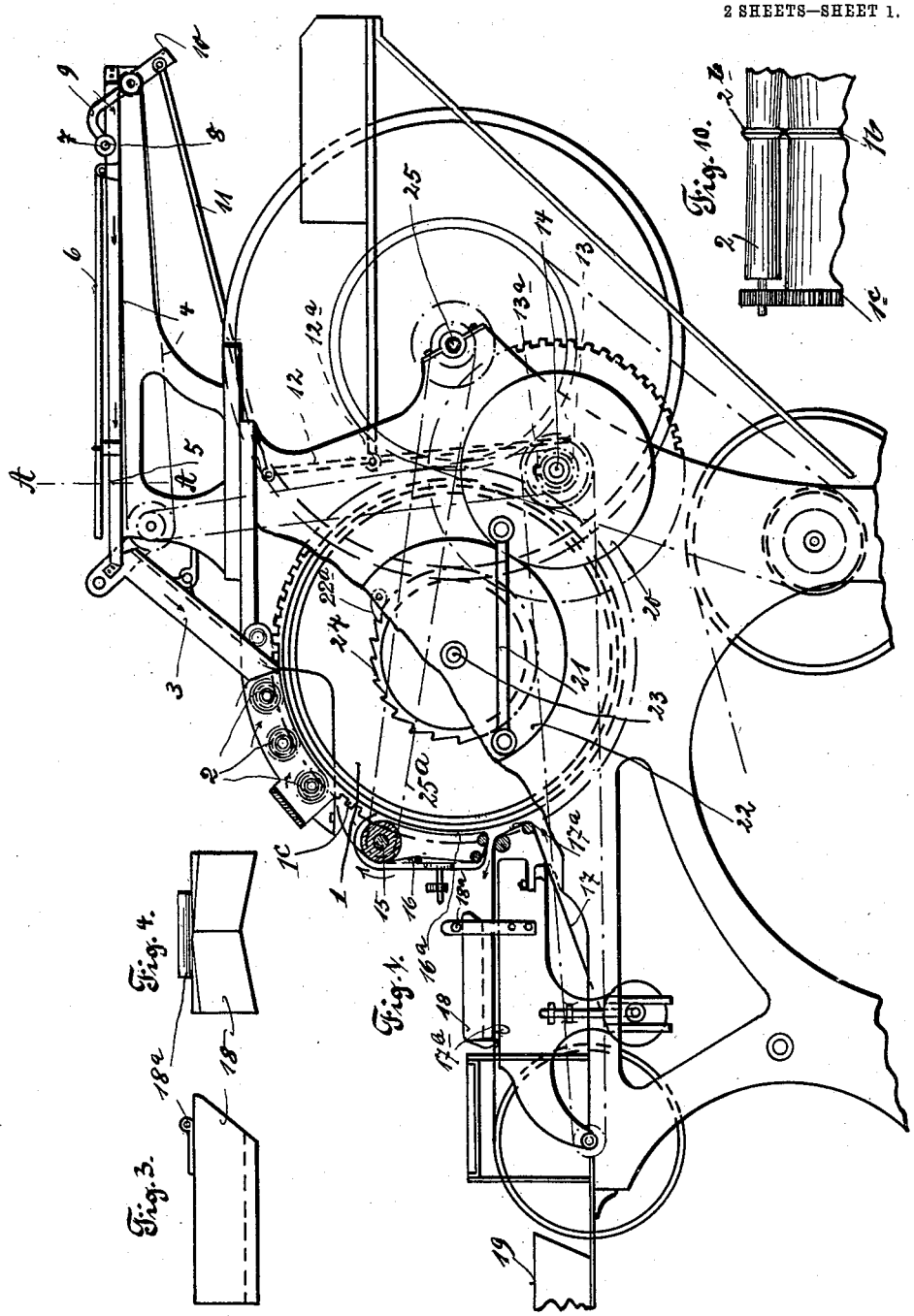

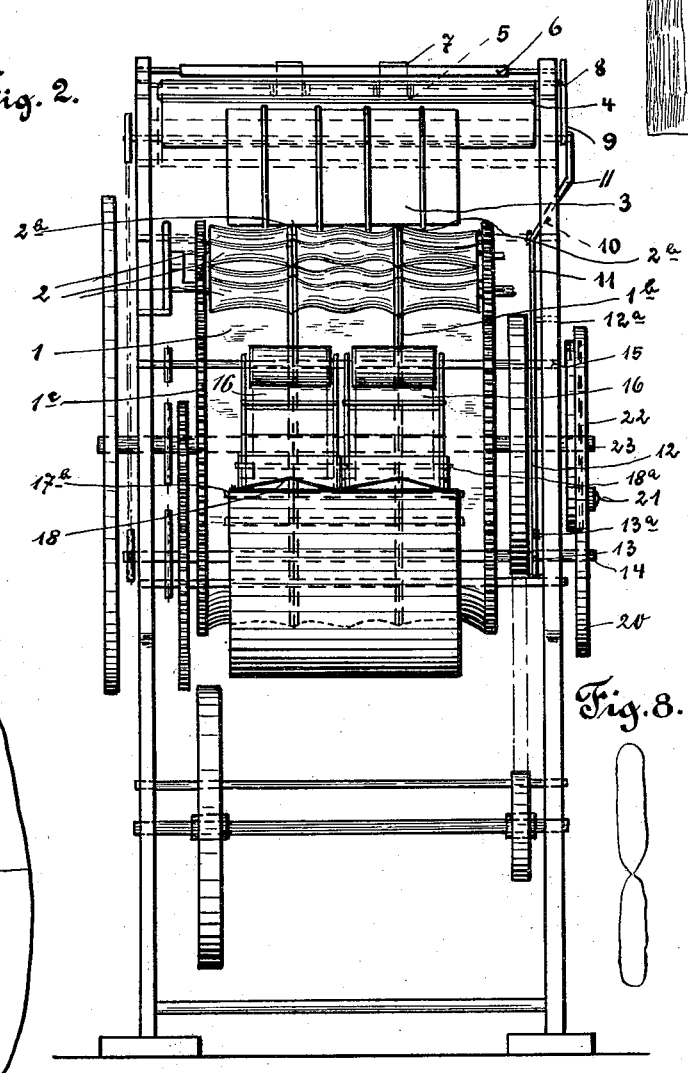

ALFRED ADELT, OF BRESLAU, GERMANY, ASSIGNOR OF ONE-FIFTH TO JOSEF BECKER AND TWO-FIFTHS TO CURT BECKER, BOTH OF BRESLAU, GERMANY.

BREAD-ROLL MACHINE.

1,015,985.   Specification of Letters Patent.   Patented Jan. 30, 1912.

Application filed April 3, 1911. Serial No. 618,735.

*To all whom it may concern:*

Be it known that I, ALFRED ADELT, a subject of the German Emperor, residing at Breslau, in Germany, have invented certain new and useful Improvements in Bread-Roll Machines, of which the following is a specification.

The object of this invention is to provide a machine for kneading, rolling and shaping dough for the production of bread-rolls, and the invention consists in the construction and combination of a series of dough-treating devices, all of which will be described with reference to the accompanying drawing and specifically pointed out in the subjoined claims.

In the drawing:—Figure 1 is a side-view of the machine partly broken away, and Fig. 2 a front-view thereof; Figs. 3 and 4 are respectively a side view and an end view of one of the shaping devices, and Fig. 5 is a section on the line A—A of Fig. 1, partly broken away. Figs. 6 to 9 are diagrams illustrating successive stages in the formation of the roll, Fig. 6 being a plan view of the lump of dough after preliminary treatment in the machine, Figs. 7 and 8 a plan and side view of the flattened lump with a transverse construction, and Fig. 9 a plan view of the finished roll; Fig. 10 shows part of the drum and a co-acting roller used for producing rolls of the shape shown in Fig. 9.

In the drawing, 1 represents a drum, with a series of rollers 2 mounted adjacent thereto. Lumps of dough such as shown in Fig. 6 are fed to this drum through inclined channels 3, from a kneading and rolling device, which comprises an endless band or belt 4 working in the direction indicated in Fig. 1 by arrows under flat parallel bars 5 fixed above it, parallel with its upper course. A cover 6 is pivoted above said bars 5, leaving the rear portions of the bars uncovered, and behind said cover two of the channels between the bars contain rollers 7 which are mounted upon a spindle 8; the spindle is carried by the upper arms of double armed levers 9, the lower ends of which are connected by a rod 10 to the upper arm 11 of a lever pivoted at 12$^a$. The lower arm 12 of this lever lies in the path of a boss 13$^a$ on a cam disk 13 fixed to a shaft 14, so that at each revolu-
tion of the cam disk the lever 11, 12 is rocked and rocks the lever 9, thereby lifting the rollers 7 out of the channels in which they work. When lumps of dough are placed in these channels behind the rollers 7, while the latter are resting on the belt 4 and are being rotated by said belt, the dough is moved against the rollers 7, which repel it, so that the dough is subjected to an action similar to manual kneading, and is formed into rolls of approximately the shape shown in Fig. 6. When the rollers 7 are raised as described, the cylindrical lumps of dough are carried by the band 4 under the hinged cover 6, by which they are crushed against the band while being conveyed toward the channels 3. The pressing of the dough against the moving band by the stationary cover produces a further efficient kneading effect.

The kneaded lumps slide down the channels 3 on to the drum 1 and pass between the same and the rollers 2, by which they are flattened before they pass under traveling belts 16. The latter are actuated by the shaft 15, rotating as indicated in Fig. 1 by an arrow, and can be swung outward at their lower ends. After passing this belt the forward end of the dough reaches the part 17$^a$ of a belt 17, by which it is rolled or curled upward to the level of the horizontal part 17$^b$ of said belt, the upper part of the dough being still between the drum and the part 16$^a$ of the belt 16. At this stage the drum 1 is automatically stopped, and the belt 16 rolls or curls the upper part of the dough downward, the disk of dough with its front and rear edges curled together, being then engaged by the part 17$^b$ of the belt 17 and carried to the final shaping devices 18. The latter are hinged at 18$^a$ and rest upon the belt 17; their under surfaces slope downward and outward from the median line, as shown in Fig. 4, so that the rolls acquire a shape tapering toward both ends. The finished rolls are delivered to the receptacle 19.

For producing the particular shape of roll shown, with a central constriction, the drum 1 and the rollers 2 are coned, to form valleys therein, as shown in Fig. 10, and have ribs 1$^b$ and 2$^b$ respectively located in the valleys. These ribs cut from opposite sides into the dough, making a constriction which subsequently facilitates the breaking of the baked roll. I may, however, use smooth rollers, or rollers of other pattern, instead of these coned and ribbed rollers. The rollers 2 are actuated by a circular rack 1° on the drum, and the latter is fixed to a shaft 23 on which is rotatably mounted a crank disk 22 carrying a pawl 22ª engaged with a ratchet wheel 24 fixed to the drum. The crank disk 22 is connected by a pitman 21 to a crank disk 20, which is fixed to the shaft 14 and is driven by toothed gear from shaft 25. The crank disk 20 is smaller than the crank disk 22, so that the latter does not make complete revolutions, but oscillates. During oscillation of the disk 22 in one direction the pawl 22ª rotates the drum; during oscillation in the opposite direction there occurs the automatic stoppage of the drum, already referred to. The rollers 7 are lifted by the cam 13, 13ª when this stoppage occurs, so that fresh lumps of dough start on the journey to the drum while those already kneaded are being stripped off the drum and curled up as described. The shaft 15 actuating the belts 16 is continuously driven from the shaft 25 by a driving belt 25ª.

What I claim as my invention and desire to secure by Letters Patent of the United States is:—

1. In a bread-roll machine the combination of a drum, means for imparting intermittent rotation to said drum, kneading rollers co-acting with said drum, means for feeding dough between said kneading rollers and drum, a continuously kneading belt positioned so that the dough kneaded by said kneading rollers passes between said kneading belt and drum in contact with both, and a continuously driven stripping belt, part of which leads away from the drum and another part of which is positioned adjacent to the drum near the delivery end of the said kneading belt and moves in the opposite direction to the drum, so that the leading and trailing ends of the dough are rolled together by said belts.

2. In a bread-roll machine the combination of a drum, means for imparting intermittent rotation to said drum, kneading rollers co-acting with said drum, a dough conveying belt, a channel for delivering dough from said conveyer belt to said drum and kneading rollers, a cover hinged above said conveyer belt so that it bears upon dough traveling on said belt to said channel, a continuously kneading belt positioned so that the dough kneaded by said kneading rollers passes between said kneading belt and drum in contact with both, and a continuously driven stripping belt, part of which leads away from the drum and another part of which is positioned adjacent to the drum near delivery end of the said kneading belt and moves in the opposite direction to the drum, so that the leading and trailing ends of the dough are rolled together by said belts.

3. In a bread-roll machine the combination of a drum, means for imparting intermittent rotation to said drum, kneading rollers co-acting with said drum, a dough conveying belt, a channel for delivering dough from said conveyer belt to said drum and kneading rollers, a cover hinged above said conveyer belt, so that it bears upon dough traveling on said belt to said channel, rollers placed in the path of the dough traveling on said conveyer belt toward said cover, said rollers being rotated by the belt in the opposite direction to the latter, means for temporarily removing the last-mentioned rollers from the dough path at intervals, a continuously kneading belt positioned so that the dough kneaded by said kneading rollers passes between said kneading belt and drum in contact with both, and a continuously driven stripping belt, part of which leads away from the drum and another part of which is positioned adjacent to the drum near the delivery end of the said kneading belt and moves in the opposite direction to the drum, so that the leading and trailing ends of the dough are rolled together by said belts.

4. In a bread-roll machine the combination of a drum, means for imparting intermittent rotation to said drum, kneading rollers co-acting with said drum, means for feeding dough between said kneading rollers and drum, a continuously kneading belt positioned so that the dough kneaded by said kneading rollers passes between said kneading belt and drum in contact with both, a continuously driven stripping belt, part of which leads away from the drum and another part of which is positioned adjacent to the drum near the delivery end of the said kneading belt and moves in the opposite direction to the drum, so that the leading and trailing ends of the dough are rolled together by said belts, and a shaping member hinged above said stripping belt where the latter leads away from the drum, so that said member bears by gravity on the rolled dough traveling on said stripping belt.

5. In a bread-roll machine the combination of a drum, means for imparting intermittent rotation to said drum, kneading rollers co-acting with said drum, said drum and kneading rollers being coned to form valleys therein and having circular ribs at the centers of said valleys, means for feeding dough between said kneading rollers and drum, a continuously kneading belt positioned so that the dough kneaded by said kneading rollers passes between said kneading belt and drum in contact with both, and a continuously driven stripping belt, part of which leads away from the drum and another part of which is positioned adjacent to the drum near the delivery end of the said kneading belt and moves in the opposite direction to the drum, so that the leading and trailing ends of the dough are rolled together by said belts.

In witness whereof I have signed this specification in the presence of two witnesses.

ALFRED ADELT.

Witnesses:
 ERNST KATZ,
 FRIEDVIG THURSCH.

Copies of this patent may be obtained for five cents each, by addressing the "Commissioner of Patents. Washington, D. C."